United States Patent [19]

Menon et al.

[11] 3,997,265

[45] Dec. 14, 1976

[54] PLATEN COVER

[75] Inventors: Sukumaran K. Menon; James E. Hutton, both of Webster, N.Y.

[73] Assignee: Xerox Corporation, Stamford, Conn.

[22] Filed: Sept. 2, 1975

[21] Appl. No.: 609,336

[52] U.S. Cl. .................................. 355/75; 355/25
[51] Int. Cl.² ...................................... G03B 27/62
[58] Field of Search ................. 355/75, 25, 82, 76, 355/; 220/256, 259

[56] References Cited

UNITED STATES PATENTS

| | | | |
|---|---|---|---|
| 1,834,897 | 12/1931 | Caps | 355/75 |
| 3,615,134 | 10/1971 | Newcomb | 355/75 |
| 3,813,161 | 5/1974 | Curtis | 355/75 |

FOREIGN PATENTS OR APPLICATIONS 455,325  2/1950  Italy ..................................... 355/75

*Primary Examiner*—L. T. Hix
*Assistant Examiner*—Edna Marie O'Connor
*Attorney, Agent, or Firm*—H. Fleischer; J. J. Ralabate; C. A. Green

[57] ABSTRACT

A cover arranged to hold an original document in the platen of an electrophotographic printing machine. The cover includes an outer member defining a chamber with an inner member being mounted therein. The outer member cooperates with the platen to form a light-tight seal while the inner member presses the original document thereagainst.

10 Claims, 4 Drawing Figures

PLATEN COVER

The foregoing abstract is neither intended to define the invention disclosed in this specification, nor is it intended to be limiting as to the scope of the invention in any way.

BACKGROUND OF THE INVENTION

This invention relates generally to an electrophotographic printing machine, and more particularly concerns a cover for holding an original document onto the printing machine platen during the reproduction process.

In electrophotographic printing, a photoconductive member is uniformly charged and exposed to a light image of an original document. This records on the photoconductive surface an electrostatic latent image corresponding to the original document. The electrostatic latent image is developed by depositing toner particles thereon in image configuration. Thereafter, the toner powder image is transferred to a sheet of support material and permanently affixed thereto providing a copy of the original document. The foregoing process was originally disclosed in U.S. Pat. No. 2,297,691 issued to Carlson in 1942.

Multi-color electrophotographic printing is substantially the same as the foregoing process with the additional requirement that a plurality of single color images are formed. Each single color light image is developed with toner particles complementary in color thereto. The differently colored toner powder images are transferred, in superimposed registration with one another, to the sheet of support material. This multi-layered powder image is then permanently affixed to the sheet of support material forming a color copy of the original document.

With the advent of high quality multi-color electrophotographic printing, exposure system requires greater light intensity than as heretofore necessary.

An exposure system of this type may generate light rays which are hazardous to the retina of the human eye. Attempts to overcome this problem by preventing light leakage are described in U.S. Pat. Nos. 3,642,371 and 3,642,376. In the foregoing patents, the platen cover has a top housing with an open bottom overlying the platen glass on which the original document being reproduced is positioned. A flexible diaphragm is secured to the bottom of the top housing to form a light-tight covering of the platen glass to prevent the escape of light rays therefrom. Systems of this type have not proven to be entirely satisfactory when light rays of the intensity required a milti-color electrophotographic printing are employed.

Accordingly, it is a primary object of the present invention to improve the platen cover employed in an electrophotographic printing machine.

BRIEF SUMMARY OF THE INVENTION

Briefly stated, and in accordance with the present invention, there is provided a closure apparatus.

Pursuant to the features of the present invention, the apparatus includes a frame with a support member having a generally planar surface mounted thereon. Means are provided for securing movably an outer member having a chamber therein on the frame. The outer member is movable from a first position preventing access to the planar surface of the support member to a second position permitting access thereto. In addition, the apparatus comprises an inner member having a generally planar surface. Means are provided for mounting the inner member movably on the frame in the chamber of the outer member. The inner member is movable from a first position in which the planar surface thereof is closely adjacent and substantially parallel to the planar surface of the support member to a second position, In the second position, the planar surface of the inner member is spaced from and substantially parallel to the planar surface of the support member.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
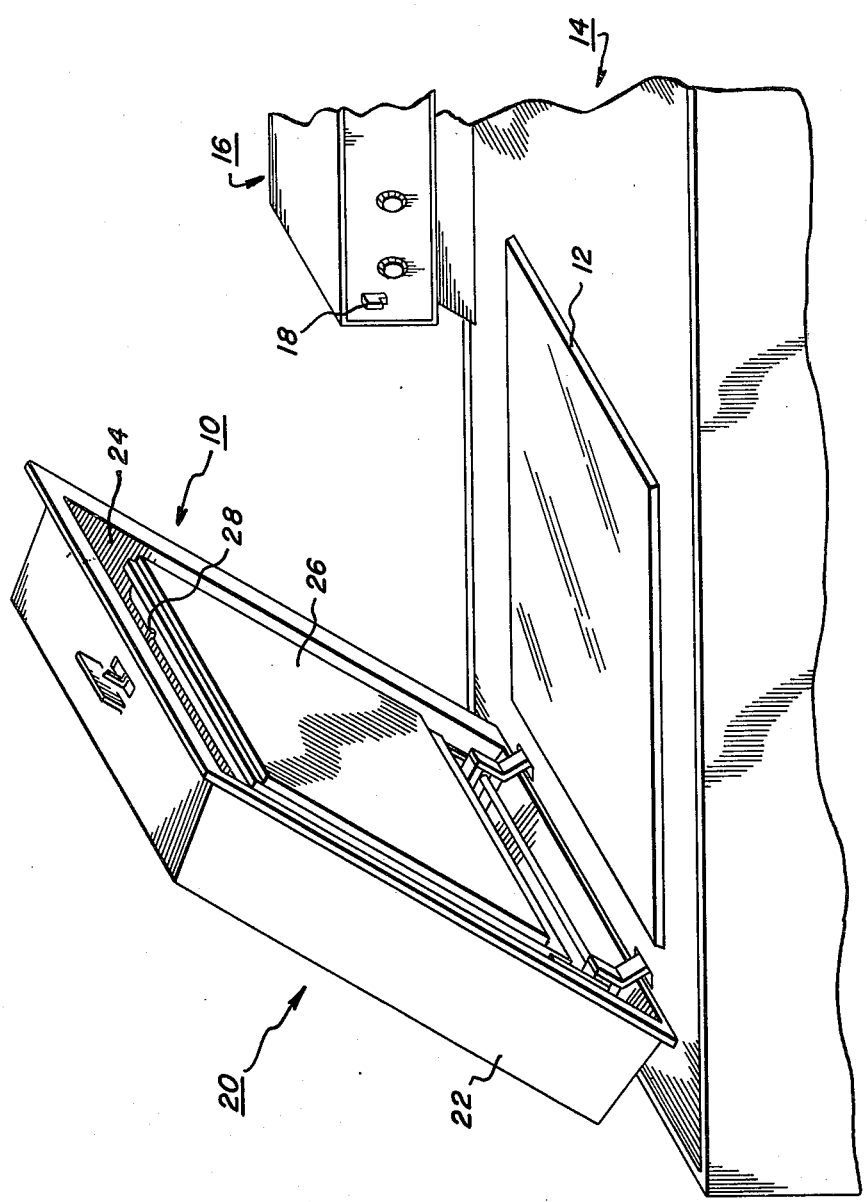
FIG. 1 is a fragmentary schematic perspective view depicting the platen cover of the present invention in association with an electrophotographic printing machine.

With continued reference to the drawings, FIG. 1 illustrates a platen cover mounted on an electrophotographic printing machine employing the features of the present invention therein. In the drawings, like reference numerals have been used throughout to designate like elements. The platen cover shown schematically in FIG. 1, illustrates the various components of the present invention. Although the cover of the present invention is particularly well adapted for use in printing machines, it will become evident from the following description that it is equally well suited for use in a wide variety of enclosures, and is not necessarily limited to the particular embodiment shown herein.

As shown in FIG. 1, the platen cover, designated generally by the reference numeral 10, is arranged to hold an original document, such as a sheet (FIG. 2), or bound volume (FIG. 3), amongst others, on transparent platen 12. Transparent platen 12 has a generally planar surface being made preferably from glass or some other suitable transparent material. Platen 12 serves as a support member for the original document positioned thereon. The frame of the electrophotographic printing machine, designated generally by the reference numeral 14, supports platen 12. The electrophotographic printing machine has a control panel, depicted generally by the reference numeral 16, which includes a print button 18. Actuation of print button 18 initiates the start of the copy cycle. The machine operator may select the desired number of copies and the cycle will continue until coincidence is obtained. Platen 12 enables the informational areas of the original document to be projected onto the charged photoconductive surface (not shown). In this manner, a latent image of the original document is recorded thereon. Subsequently, the latent image is developed with toner particles and the powder image is transferred to a sheet of support material. Thereafter, the powder image is permanently affixed to the sheet of support material forming a copy of the original document positioned on platen 12.

As shown in FIG. 1, platen cover 10 includes an outer member, designated generally by the reference numeral 20. Outer member 20 is a box-like housing 22 having an open-ended chamber 24 with an inner member, designated generally by the reference numeral 26, disposed therein. Outer member 20 is mounted pivotably on the machine frame 14. Inner member 26 is mounted slidably and pivotably within chamber 24 of outer member 20. A counter balance (FIGS. 2 and 3) is employed to maintain the cover in any preferred orientation. The counter balance is merely a weight positioned internally of the machine on the opposed side of the pivot to balance the weight of the platen cover. Latch 28 mounted on outer member 20 engages a corresponding catch in the machine frame when outer member 20 is in the closed position.

Figure 2:
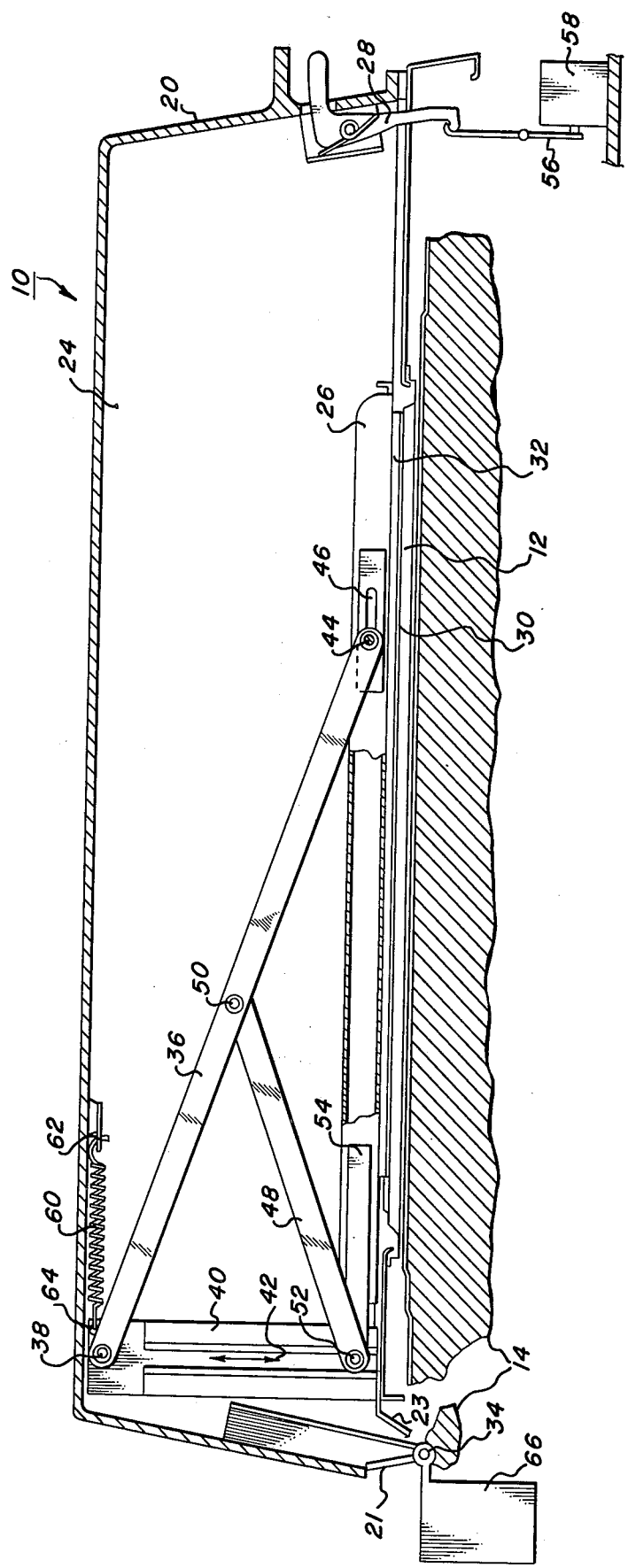
FIG. 2 is an elevational view of the FIG. 1 platen cover with the original document being a sheet.
Figure 3:
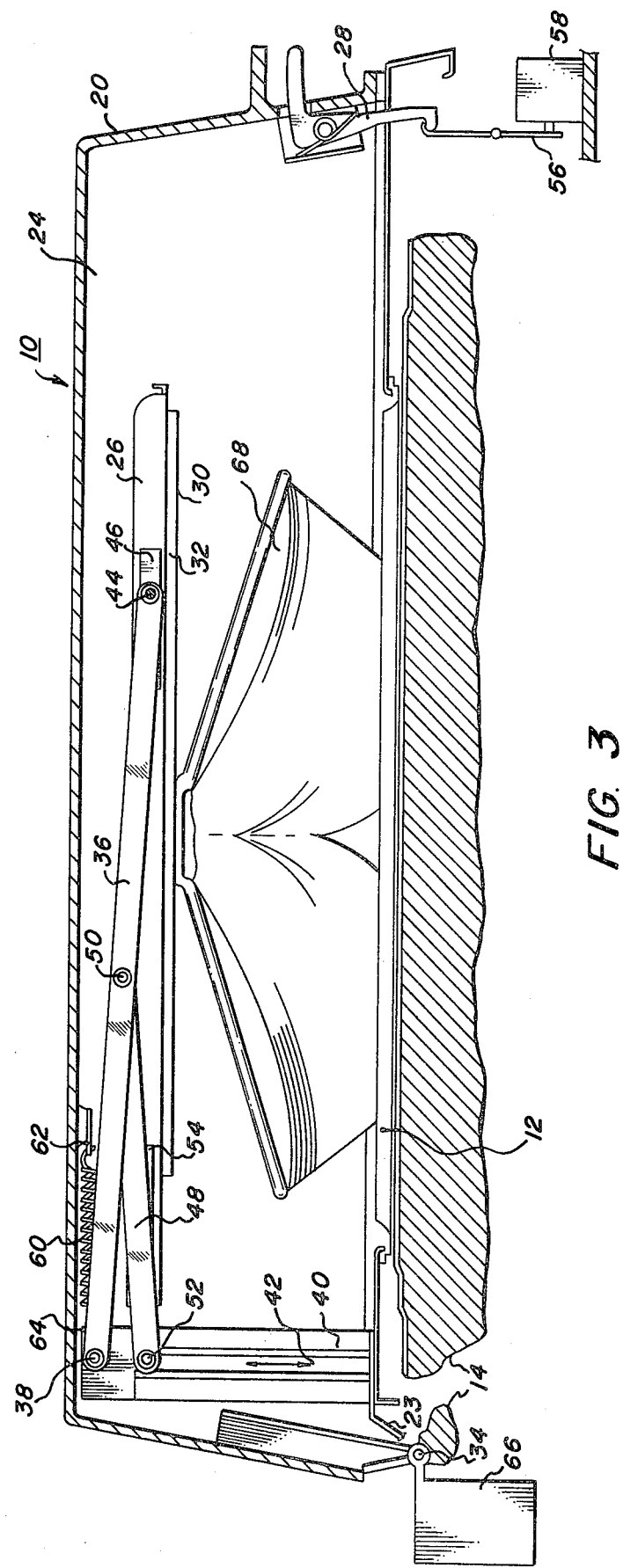
FIG. 3 is an elevational view of the FIG. 1 platen cover with the original document being a book.

Referring now to FIG. 2, the detailed structural configuration of the outer and inner members of platen cover 10 will hereinafter be discussed. In FIG. 2, a sheet-like original document 30 is positioned on platen 12. Platen 12 is substantially rectangular and supported in a rectangular aperture in machine frame 14. Inner member 26 has a generally planar surface 32 in engagement with sheet 30. As shown in FIG. 2, outer member 20 is in the closed position. Outer member 20 is mounted on hinge 21 which, in turn, is mounted pivotably on bar 34 secured to machine frame 14. Similarly, inner member 26 is mounted pivotably and slidably within chamber 24 of outer member 20. Bar 36 has one end region thereof mounted pivotably on rod 38. Rod 38 is mounted in upright 40 which extends in an upwardly direction substantially normal to the surface of platen 12. Upright 40 has slot 42 therein and is secured to hinge 23. Hinge 23 is mounted pivotably on bar 34. In this manner, inner member 26 pivots independently of outer member 20. The other end region of rod 36 is mounted pivotably on rod 44. Rod 44 is mounted slidably in slot 46 of inner member 26. Bar 48 has one end region thereof mounted pivotably on rod 50. Rod 50 is secured to bar 36 of a region intermediate the end regions thereof. The other end region of bar 48 is mounted on rod 52. Rod 52 is mounted slidably in slot 42 of upright 40. In addition, bar 54 has one end region thereof secured fixedly to inner member 26 while the other end region thereof is attached fixedly to rod 52. In this manner, a linkage is formed which moves inner member 26 substantially parallel to the surface of platen 12. Thus, planar surface 32 of inner member 26 remains substantially parallel to the planar surface of platen 12. In the first position, planar surface 32 contacts a sheet of support material 30 positioned on platen 12. In the second position, as shown in FIG. 3, planar surface 32 is spaced from rather than being closely adjacent to platen 12. Under these circumstances, a large or thick original document such as a book is positioned on platen 12. The foregoing is depicted more clearly in FIG. 3.

With continued reference to FIG. 2, latch 28 is mounted pivotably on outer member 20. When outer member 20 is in the closed position catch 56 receives latch 28 locking the platen cover. Catch 56 is mounted pivotably on machine frame 14. In the closed position, solenoid 58 is energized pivoting catch 56 to engage latch 28.

In operation, control panel 16 may be programmed for the number of copies desired and then print button 18 pressed. At the end of the copying cycle, latch 28 is released from catch 56. Catch 56 is pivoted to the open position by de-energization of solenoid 58. Outer member 28 may then be pivoted to the open position by pressing latch 28. It has often been found necessary to adjust the copy sheet prior to the copying cycle. To this end, latch 28 may be opened prior to the actuation of print button 18. Thus, cover 10 may be opened at any time before the initiation of the copying cycle. However, pressing catch 28 during the copying cycle will have no effect due to the fact that solenoid 58 is energized holding catch 56 in locking engagement with latch 28. Whenever the programmed number of copies has been generated, the machine then realizes coincidence and produces a signal de-energizing solenoid 58. At this time, there is no danger of radiation leakage injuring the retina of the machine operator and outer member 20 may be opened.

Outer member 20 is resiliently urged to return to the open position by a coil spring 60. Spring 60 has one end portion 62 thereof secured to outer member 20. End portion 64 of spring 60 is secured to the upper region of upright 40. A counterbalance weight 66 is also mounted pivotably on rod 34 and secured to outer member 20. Counterbalance 66 neutralizes the wieght of outer member 20 permitting the machine operator to readily raise the outer member.

Referring now to FIG. 3, there is shown a book 68 positioned on platen 12. Planar surface 32 of inner member 26 is in engagement with book 68. Planar surface 32 is spaced from platen 12 and substantially parallel therewith. Parallel movement of inner member 26 is permitted by the mounting or bar linkage thereof. As heretofore described, bar 36 has one end region thereof mounted pivotably on rod 38. The other end region thereof is secured pivotably to rod 44 which is mounted slidably in slot 46 of inner member 26. Similarly, bar 48 has one end region thereof mounted on rod 52. Rod 52 is mounted slidably in slot 42 of upright 40. When inner member 26 is moved to its extreme position, i.e., about 4 inches from platen 12, rod 52 is in its uppermost position in slot 42. The other end region of bar 48 is mounted pivotably on rod 50 which is secured to bar 36 at a region intermediate the end region thereof. Finally, bar 54 has one end region thereof secured to rod 52 while the other end region thereof is secured fixedly to inner member 26. Bar 54 is mounted substantially parallel to platen 12. Thus, FIG. 2 depicts the position of inner member 26 when a thin document such as a sheet is positioned on platen 12. As described therein, the planar surface of inner member 26 is closely adjacent to platen 12 and substantially parallel therewith. Contrawise, when a large or thick document such as a book is positioned on platen 12, planar surface 32 of inner member 26 is spaced from and substantially parallel to platen 12, as shown in FIG. 3.

Figure 4:
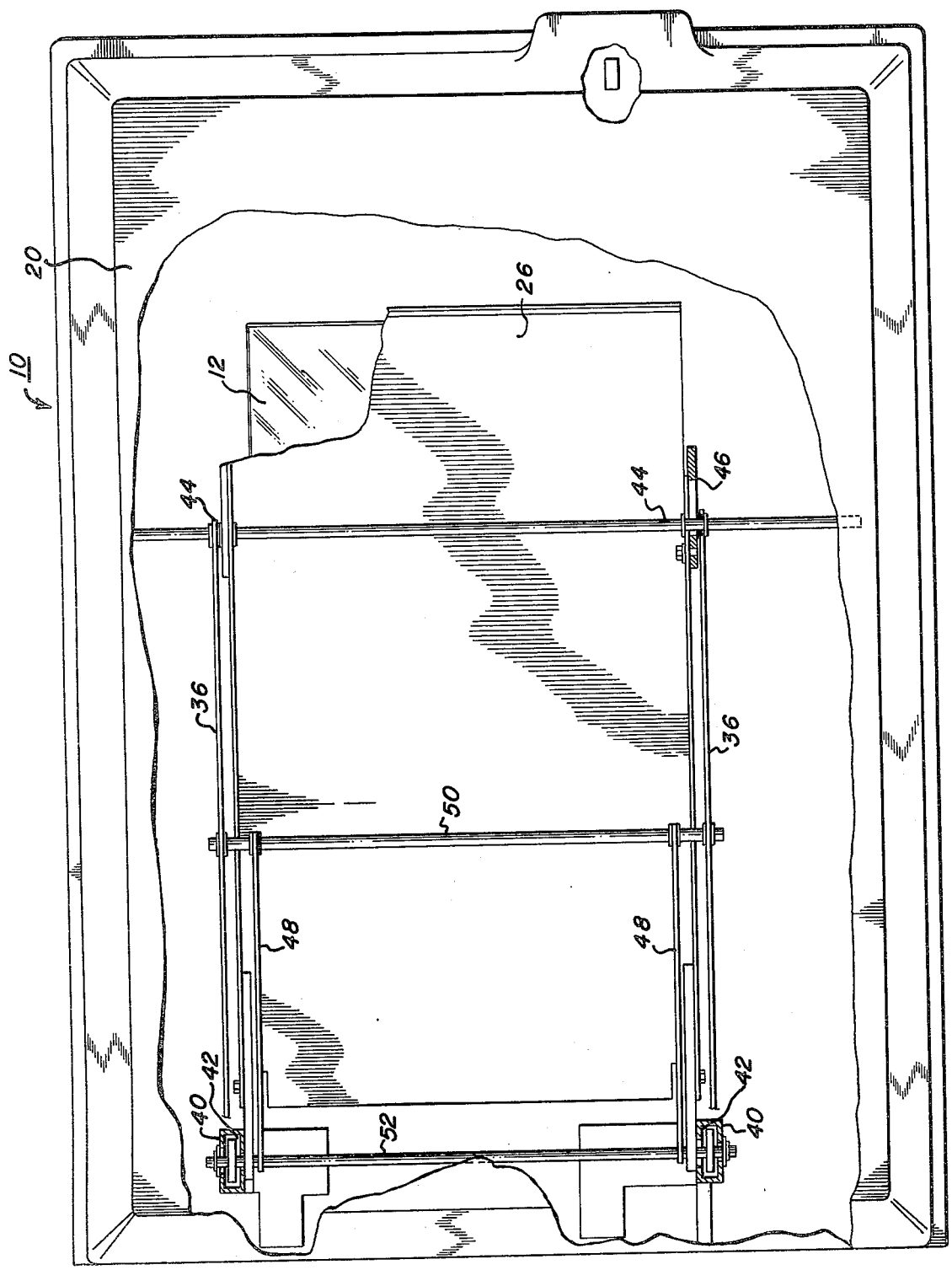
FIG. 4 is a fragmentary plan view, partially in section, illustrating the FIG. 1 platen cover.

Turning now to FIG. 4, there is shown a plan view of platen cover 10. As depicted therein, it is evident that a pair of bars 36 are employed. Each bar is substantially parallel to and spaced from one another. As heretofore described, one end region of each bar is secured to rod 44. Similarly, a pair of opposed spaced substantially parallel bars 48 are secured pivotably to rod 50. Rod 50 is simply supported by bars 36. The other end region of bars 48 are mounted pivotably on rods 52. Rod 52 is mounted slidably in slots 42 of uprights 40.

By way of example, outer member 20 is made preferably from a suitable light weight, substantially rigid plastic. A rubber gasket is secured to the bottom region thereof so that when outer member 20 is in the closed position it forms a light-tight seal with the machine frame. Similarly, inner member 26 is also formed from a substantially rigid light weight plastic. Suitable roller bearings may be employed on their respective rods at the points of connection between their respective bars to permit relative movement therebetween. One type of suitable roller bearing is a Nylon or Teflon bearing.

In recapitulation, a platen cover has been described which comprises an outer member for forming a light-tight seal about the platen to prevent extraneous light rays from injuring the eye of the operator during the copying cycle. The outer member is maintained in the locked position during the entire copying sequence and is automatically released only after copying is completed. Thus, the outer member remains in the closed condition for a preselected duration of time depending upon the number of copies being reproduced by the electrophotographic printing machine. The outer member defines a chamber having an inner member mounted therein. The inner member is mounted movably within this chamber. In this way, the planar surface of the inner member may be positioned closely adjacent to the platen of the printing machine, e.g. single sheet copying, or spaced therefrom, e.g. book copying. In both of these situations, the planar surface of the inner member remains substantially parallel to the platen planar surface.

It is, therefore, evident that there has been provided, in accordance with the present invention, a platen cover that fully satisfies the objects, aims and advantages hereinbefore set forth. While this invention has been described in conjunction with a specific embodiment, it is evident that many alternatives, modifications, and variations will be apparent to those skilled in the art. Accordingly, it is intended to embrace all such alternatives, modifications, and variations that fall within the spirit and broad scope of the appended claims.

What is claimed is:
1. A closure apparatus, including:
a frame;
a support member having a generally planar surface mounted on said frame;
an outer member defining a chamber;
means for securing said outer member movably on said frame, said outer member being movable from a first position preventing access to the planar surface of said support member to a second position permitting access to the planar surface of said support member;
an inner member having a generally planar surface; and
means for mounting said inner member movably on said frame, said inner member being movable in the chamber of said outer member from a first position with the planar surface thereof being closely adjacent and substantially parallel to the planar surface of said support member to a second position with the planar surface thereof being spaced from and substantially parallel to the planar surface of said support member.

2. An apparatus as recited in claim 1, further including means for automatically locking said outer member in the first position for a pre-selected period of time.

3. An apparatus as recited in claim 2, wherein said securing means includes a first bar mounted on said frame and having said outer member mounted pivotably thereon.

4. An apparatus as recited in claim 3, wherein said mounting means includes:
an upright having a slot therein and being mounted pivotably on said first bar;
a second bar having one end region thereof mounted slidably and pivotably on said upright;
a third bar having one end region thereof mounted pivotably on said upright at a distance spaced from the planar surface of said support member, said third bar having the other end region thereof secured pivotably and slidably to one end region of said inner member, said second bar having the other end region thereof secured pivotably to an intermediate region of said third bar; and
a fourth bar having one end region thereof secured to the one end region of said second bar and the other end region thereof being secured to the other end region of said inner member.

5. An apparatus as recited in claim 4, wherein said locking means includes:
a latch mounted on said outer member;
a catch;
a solenoid mounted on said frame and having said catch mounted thereon; and
means for energizing said solenoid for a pre-selected duration of time so that said catch engages said latch securing said outer member in the first position.

6. An electrophotographic printing machine of the type in which an original document disposed on a generally planar transparent platen secured to the machine frame has a pre-selected number of copies thereof reproduced, wherein the improved cover apparatus for holding the original document thereon includes:
an outer member defining a chamber;
means for securing said outer member movably on the machine frame, said outer member being movable from a first position preventing access to the platen to a second position permitting access to the platen;
an inner member having a generally planar surface; and
means for mounting said inner member movably on the machine frame, said inner member being movable in the chamber of said outer member from a first position with the planar surface thereof being closely adjacent and substantially parallel to the platen to a second position with the planar surface thereof being spaced from and substantially parallel to the platen.

7. A printing machine as recited in claim 6, further including means for automatically locking said outer member in the first position during the reproduction of the pre-selected number of copies.

8. A printing machine as recited in claim 7, wherein said securing means includes a first bar mounted to the machine frame and having said outer member pivotably thereon.

9. A printing machine as recited in claim 8, wherein said mounting means includes:

an upright having a slot therein and being mounted pivotably on said first bar;

a second bar having one end region thereof mounted slidably and pivotably on said upright;

a third bar having one end region thereof mounted pivotably on said upright at a distance spaced from the platen, said third bar having the other end region thereof secured pivotably and slidably to one end region of said inner member, said second bar having the other end region thereof secured pivotably to an intermediate region of said third bar; and a fourth bar having one end region thereof secured to the one end region of said second bar and the other end region thereof being secured to the other end region of said inner member.

10. A printing machine as recited in claim 9, wherein said locking means includes:

a latch mounted on said outer member;

a catch;

a solenoid mounted on the machine frame and having said catch mounted thereon; and means for energizing said solenoid for the duration that the electrophotographic printing machine reproduces the pre-selected number of copies so that said catch engages said latch securing said outer member in the first position during the copying operation.

* * * * *